United States Patent [19]

Anstey et al.

[11] Patent Number: 5,181,368
[45] Date of Patent: Jan. 26, 1993

[54] HOUSING FOR HOLDING A SUPPLY ROLL OF LARGE ROUND BALE WRAP MATERIAL

[75] Inventors: Henry D. Anstey; William A. Ardueser, both of Ottumwa; George W. Rumph, Bloomfield, all of Iowa

[73] Assignee: Deere & Company, Moline, Ill.

[21] Appl. No.: 809,002

[22] Filed: Dec. 17, 1991

[51] Int. Cl.⁵ .............................................. B65B 11/04
[52] U.S. Cl. .................... 53/587; 53/389.3; 53/118; 53/389.2; 242/55.53; 242/58.6; 242/68.7; 242/75.4
[58] Field of Search ...................... 53/118, 587, 389.2, 53/389.3; 242/55.1, 55.53, 58.6, 68.7, 75.4, 78.7, 79

[56] References Cited

U.S. PATENT DOCUMENTS

| | | | |
|---|---|---|---|
| 2,570,941 | 10/1951 | Grigsby | 242/58.6 |
| 2,601,956 | 7/1952 | Birr | 242/55.53 |
| 2,656,050 | 10/1953 | Best | 242/68.7 |
| 3,245,633 | 4/1966 | Madel | 242/75.4 |
| 3,296,780 | 1/1967 | Revell | 242/58.6 |
| 3,834,637 | 9/1974 | Reed | 242/78.7 |
| 3,920,136 | 11/1975 | Talbert | 242/68.7 |
| 4,176,801 | 12/1979 | Douglas | 242/68.7 X |
| 4,604,848 | 8/1986 | Clostermeyer | 53/118 |
| 4,995,216 | 2/1991 | Vansteelant | 53/118 X |

FOREIGN PATENT DOCUMENTS

2818188 10/1979 Fed. Rep. of Germany ..... 242/68.7
22245 2/1983 Japan ................................. 242/55.53
566759 7/1977 U.S.S.R. ............................ 242/68.7

Primary Examiner—John Sipos

[57] ABSTRACT

A large round baler is equipped with a wrapping mechanism for applying a web of plastic material to a bale located in the bale-forming chamber. The wrapping mechanism includes a housing including a cover mounted to the rear of the discharge gate of the baler for pivoting vertically, about a first horizontal transverse axis at an upper forward location of the cover, between a lowered closed position, wherein it encloses a roll of wrap material resting on a pair of roll end supports, and a raised position permitting access to the roll end supports. A pair of gas springs are coupled between opposite side walls of the cover and spaced apart crank arms of a load member which is vertically pivotally supported from the gate for swinging about a second horizontal transverse axis located slightly below and rearwardly of the first axis. The disposition of the gas springs relative to the first and second axes is such that the springs act to maintain a load bar of the load member urged into contact with a roll of wrap material supported on the roll end supports when the cover is in its closed position and acts to pivot the load member so as to dispose the load bar thereof in a raised inoperative position in response to the cover being raised to its open position, the springs also acting to maintain the cover in its raised position.

37 Claims, 5 Drawing Sheets

HOUSING FOR HOLDING A SUPPLY ROLL OF LARGE ROUND BALE WRAP MATERIAL

BACKGROUND OF THE INVENTION

The present invention relates to a mechanism for enveloping large round bales, formed in a bale-forming chamber, with a wrap material such as plastic sheet or net and more particularly relates to a housing for holding a supply of such wrap material in a position for being fed into the bale-forming chamber.

Heretofore, designers of wrap material housings used for holding material for being dispensed for wrapping a bale have taken into consideration the ease of loading a roll of material into the housing and the desirability of applying a constant drag or braking force on the loaded roll of material during the wrapping process. For example, U.S. Pat. No. 4,787,193 granted on 29 Nov. 1988 discloses such a housing having a cover which may be pivoted to a lowered, substantially inverted position for receiving a roll of wrapping material and then raised to deposit the roll on a floor or bottom wall of the cover. This patent also discloses a spring biased brake member mounted to the cover and operable for biasing the roll into contact with a fixed forward wall of the housing and the floor with a force which remains substantially constant as the diameter of the roll diminishes during usage.

Another example of such a housing is that disclosed in U.S. Pat. No. 4,956,960 granted on 18 Sep. 1990. This housing includes a cover which pivots upwardly to a raised position, in which it is retained by a pair of gas springs, to permit a pivotally mounted wrap material loading arm, which is shaped for cradling a roll of wrapping material when lowered to a load position, to be raised to deposit the roll of material on a fixed bottom wall which is curved convexly upwardly and extends downwardly toward the bale-forming chamber and a vertical abutment wall such that an approximate constant wedging or braking force is exerted on the roll as its diameter diminishes during wrapping of the material about a bale.

While the manner of loading a roll of wrap material into these known housings is generally satisfactory, the structures for doing such are relatively complex and/or expensive. Also, it has been found that while these known structures function to produce substantially constant braking forces on the roll during the wrapping of a bale under ideal conditions, the roll braking forces of both are sensitive to the condition of the front wall and floor surfaces supporting the wrap material during wrapping operation. Specifically, the braking force is influenced by such variations in surface condition as may be caused by paint wearing off and/or by the surface becoming corroded.

SUMMARY OF THE INVENTION

According to the present invention there is provided a novel wrapping mechanism for applying wrap material to a large round bale and more specifically there is provided a simplified, improved wrapping material roll housing designed for easy loading of wrap material rolls and for ensuring that a substantially constant braking or drag force will be exerted on a roll of wrap material for resisting the unrolling thereof during wrapping operation.

An object of the invention is to provide a wrap material housing having separate, right and left roll end supports for supporting opposite end portions of a wrap material roll thereby permitting the roll to be loaded by lifting first one then the other end into place on the end supports.

Another object of the invention is to provide a wrap material housing, as set forth in the previous object, with a pair of laterally spaced angular, wrap material loading handles for supporting a roll of wrap material in a staging position below and adjacent to the roll end supports and from which the roll may be lifted onto the roll end supports.

A more specific object of the invention is to provide a wrap material housing having right and left roll end supports, as described above, wherein the supports include plates which are crowned from side-to-side to permit a relatively large or loose misalignment tolerance and to position the inner edges of the plates substantially out of contact with the roll so as to prevent damage to the wrap material.

Yet another object of the invention is to provide a wrap material housing with wrap material contact surfaces that may be easily preserved in a corrosion resistant state.

Yet another specific object of the invention is to provide wrap material contact surfaces which are made of sheets of stainless steel foil that are bonded to an underlying base of corrodible material.

Still a more specific object of the invention is to provide double-sided adhesive tape formed of elastomeric material to bond a sheet of corrosive resistant metal foil to a corrodible metal base, the tape thereby permitting the foil to flex to even out the loading due to the combination of the weight of the material roll and the brake force applied to the roll.

A further object of the invention is to provide a wrap material housing having a brake member which is biased toward the roll by the same spring assembly used for holding the housing cover in a raised position.

A more specific object of the invention is to provide a wrap material housing, as set forth in the previous object, wherein the brake member is automatically swung away from a braking position to a raised position, in response to opening the housing cover, for permitting a new roll of wrap material to be loaded into the housing.

These and other objects are accomplished by a housing structure including at least one gas spring connected between a cover hinged at an upper forward location thereof and a forwardly projecting crank of a brake member that is vertically pivotally mounted beneath the cover at a location adjacent the cover hinge. The gas spring operates along a line of action located such that, when the cover is in a latched closed position, it biases the brake member downwardly about its pivot connection and, when the cover is in a raised position, the spring biases the cover upwardly about the hinge and the brake member upwardly about its pivot connection, the gas spring automatically forcing the brake member to its raised position in response to the cover being lifted to its raised position. A pair of laterally spaced, angled roll material loading handles are pivotable about an upright axis to dispose lower legs thereof from a stored, inwardly projecting location beneath the cover when the latter is closed to a rearwardly projecting, load position when the cover is open. Right- and left-hand wrap material roll end supports are mounted above and forwardly of the loading arms so as to permit the roll of material to be lifted on to the supports one end at a time. The roll supporting surface of each of the supports is bowed upwardly between inner and outer ends and is covered with a sheet of stainless steel foil that is bonded to the supports by double-sided, adhesive tape made of an elastomeric material. Located forwardly of each of the roll end supports is an upright roll contact panel having a roll contact surface that is also constructed of a sheet of stainless steel foil bonded to the panel in a manner similar to the support surface of the roll end supports.

DESCRIPTION OF THE PREFERRED EMBODIMENT

Figure 1:
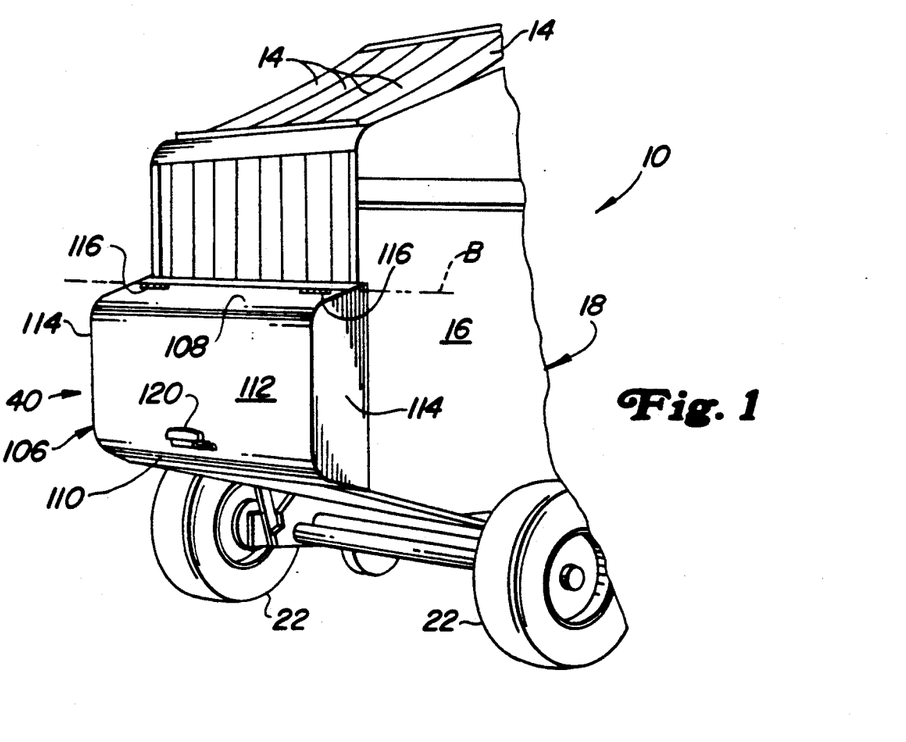
FIG. 1 is a left rear perspective view of the rear portion of a large round baler equipped with a bale wrapping mechanism including a roll housing constructed in accordance with the principles of the present invention.
Figure 2:
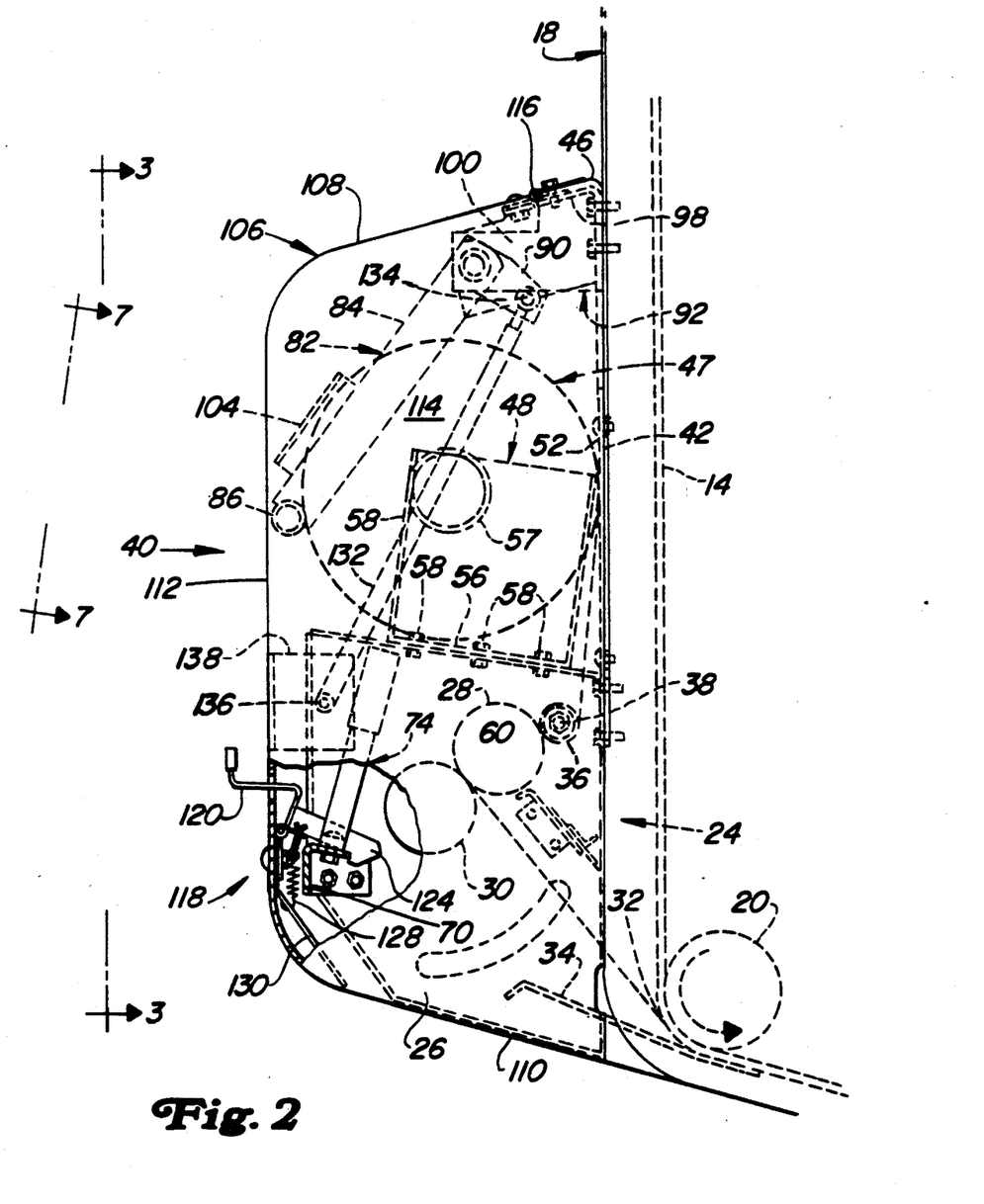
FIG. 2 is a right side elevational view of the bale wrapping mechanism, with parts omitted for simplicity, showing the housing cover in its closed position and partially broken away to expose the cover latch mechanism: and showing the brake member in its roll-engaging, braking position.
Figure 4:
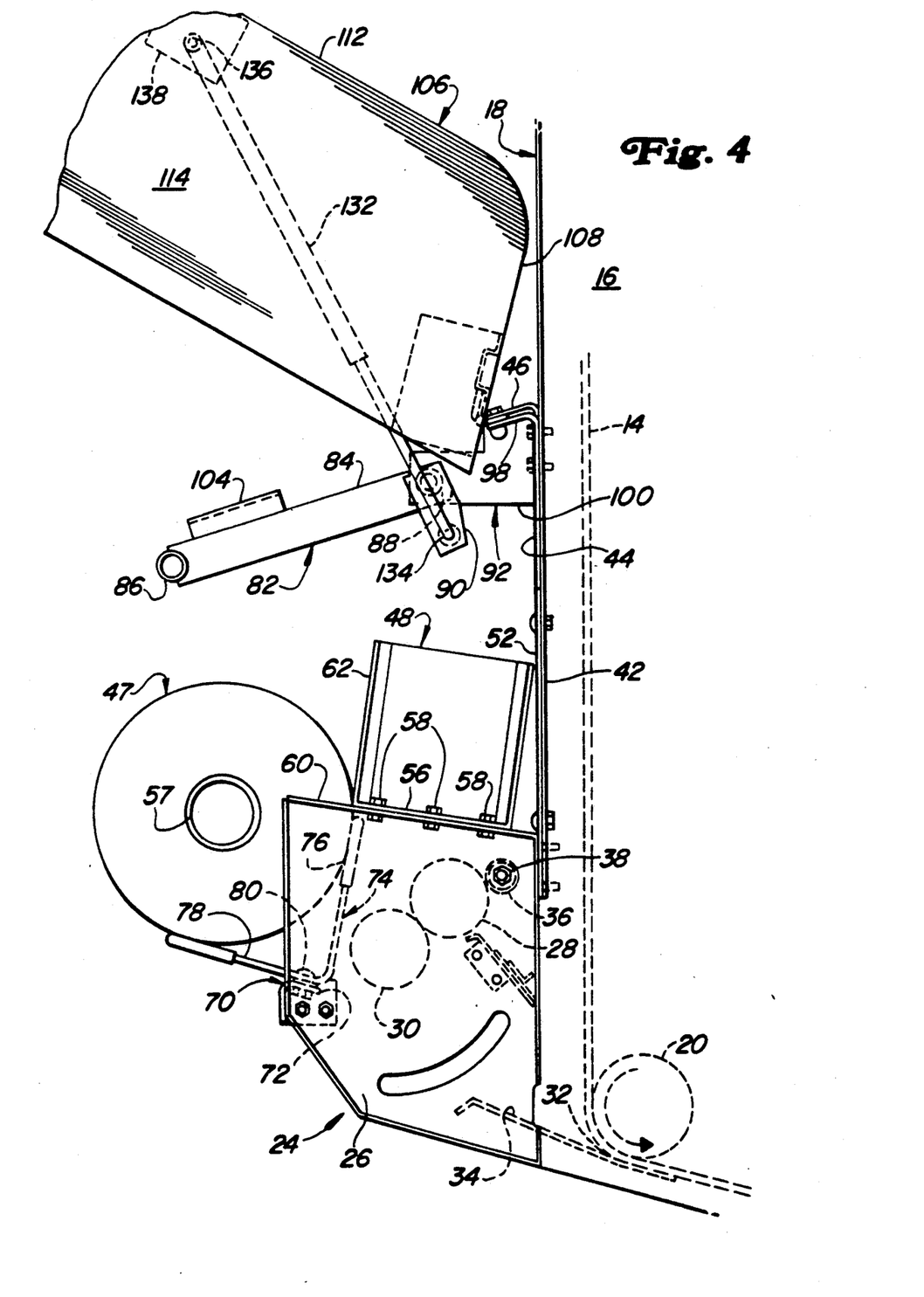
FIG. 4 is a view like FIG. 2 but showing the housing cover in its open position and the brake member in its raised inoperative position; and showing a roll of wrap material supported on the loading handles.

Referring now to FIG. 1, there is shown the rear portion of a large round baler 10 of a type including an expansible bale-forming chamber formed in part by a plurality of endless, side-by-side mounted belts 14, in part by opposite side walls (not shown) of a forward portion of the baler that support a first set of belt support rolls and in part by opposite side walls 16 of a bale discharge gate 18, the walls 16 supporting a plurality of belt support rolls 20 of which only a lower rear one is shown (see FIGS. 2 and 4). A pair of ground wheels 22 support the baler for being towed by a tractor.

Figure 3:
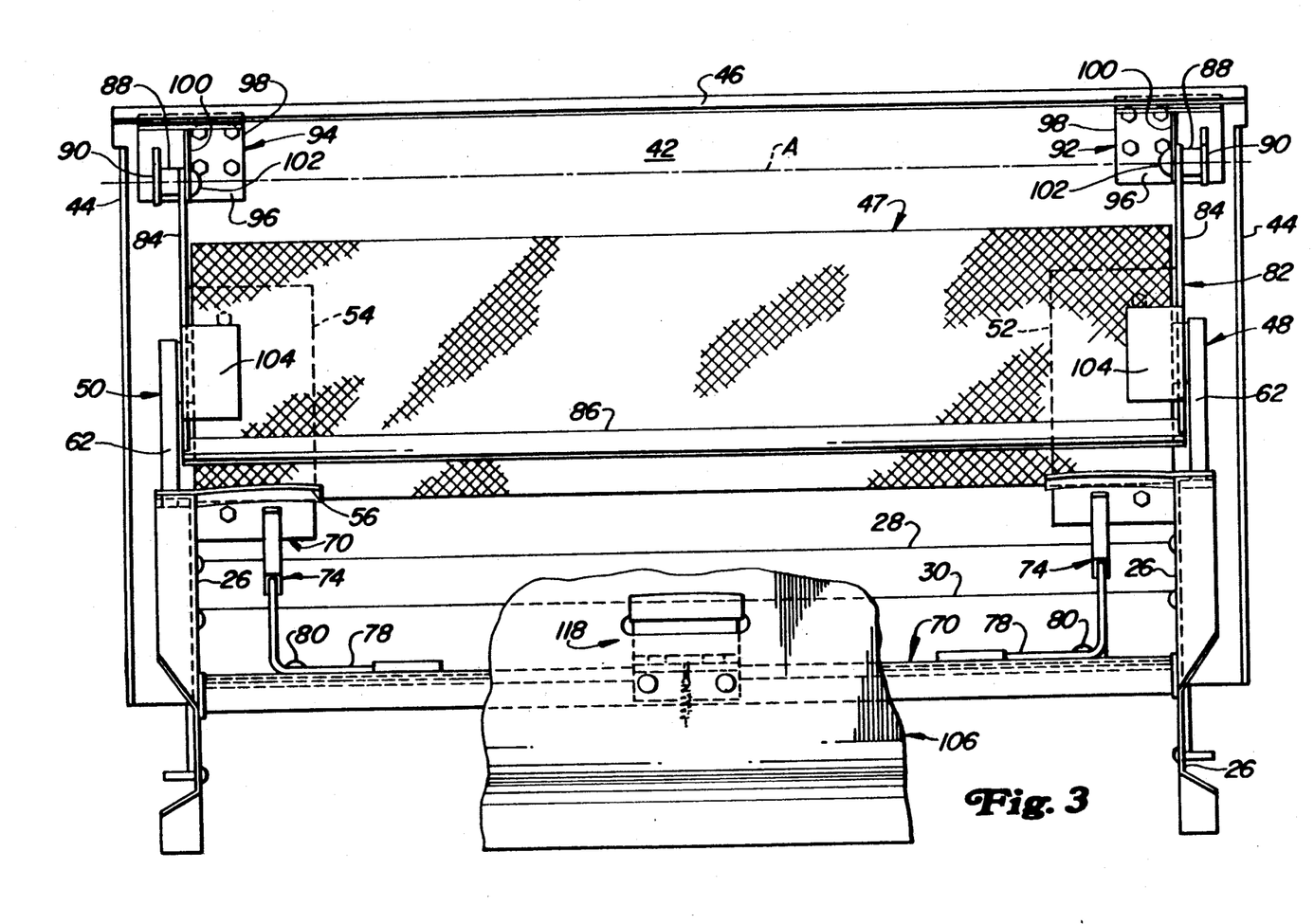
FIG. 3 is a rear elevational view taken along line 3—3 of FIG. 2, but with all but the lower central portion of the housing cover being removed for clarity.

Referring now also to FIGS. 2-4, a portion of a bale wrapping mechanism 24 is shown mounted to the rear and lower portions of the discharge gate 18, with parts of the mechanism being omitted for simplicity. The mechanism 24 includes opposite support walls 26 having forward, upright, transverse flanges bolted to similar flanges formed at the respective rear ends of the gate side walls 16. Extending between and having their opposite ends rotatably mounted to the support walls 26 are a pair of wrap material feed rolls 28 and 30, with the roll 28 being disposed above and forwardly of the roll 30 such that a material flight path, defined by a plane located tangentially to the rolls at their bite or nip, extends substantially into a bite or nip area 32 defined by a guide pan portion 34 and a portion of the belts 14 engaged with the lower rear support roll 20. Located forwardly and above the upper feed roll 28 is a material guide roll 36 having its opposite ends rotatably supported by respective bearings (not shown) mounted in an upper forward location of the support walls 26 by respective bolts 38.

The bale wrap mechanism 24 further includes a wrap material supply roll housing 40 having a front wall defined by an upright support panel 42 that is secured to and extends between the rear ends of the gate side walls. The opposite lateral ends of the panel 42 are defined by respective rearwardly projecting flanges 44 while the top of the panel is defined by a rearwardly and downwardly projecting flange 46.

For supporting a wrap material supply roll 47, the housing 40 includes right- and left-hand, L-shaped roll end supports 48 and 50, and right- and left-hand roll abutment panels 52 and 54 bolted to the support panel 42 at respective locations forwardly of the end supports 48 and 50. Each of the roll end supports 48 and 50 include a rectangular, downwardly and forwardly inclined roll support plate section 56 that is upwardly bowed between inner and outer edges or ends thereof and has an outer end portion overlying and bolted, as at 58 (see FIG. 4), to a respective flange 60 formed at the top of each of the support walls 26. Each of the roll end supports 48 and 50 further includes an outwardly opening, upright channel section 62 welded to the outer end portion of the support plate section 56 located on the flange 60, the channel sections 62 acting against opposite ends of a core tube 57 of the wrap material roll 47 to prevent sideways shifting movement of the roll during baling operation.

Figure 5:
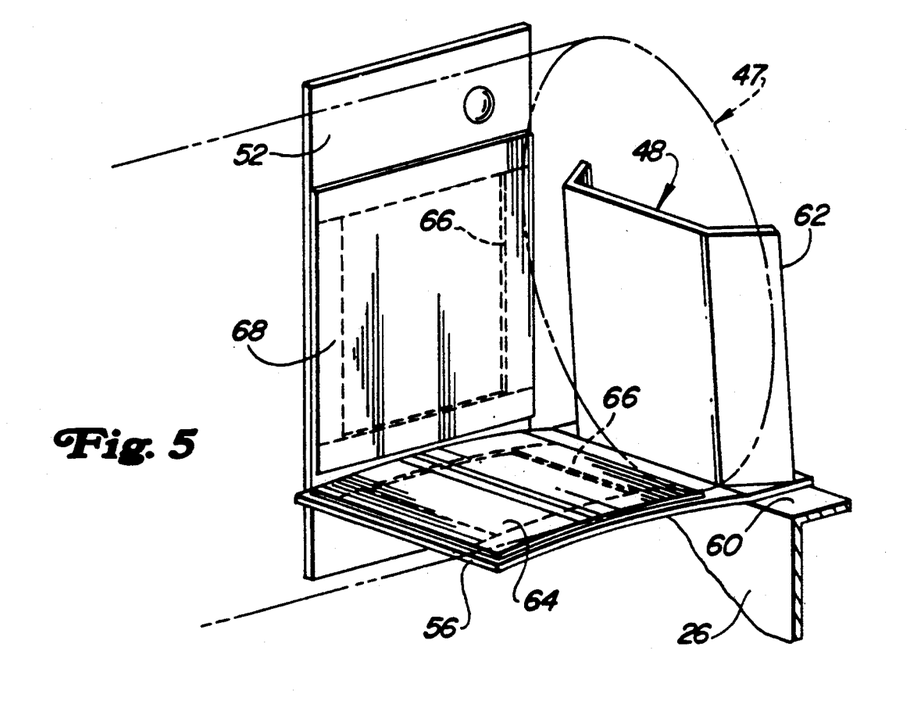
FIG. 5 is a left rear perspective view of the right-hand wrap material end support and panel section having wrap material roll contact surfaces formed by sheets of stainless steel foil bonded to the end support and panel section by elastomeric, double-sided adhesive tape.
Figure 7:
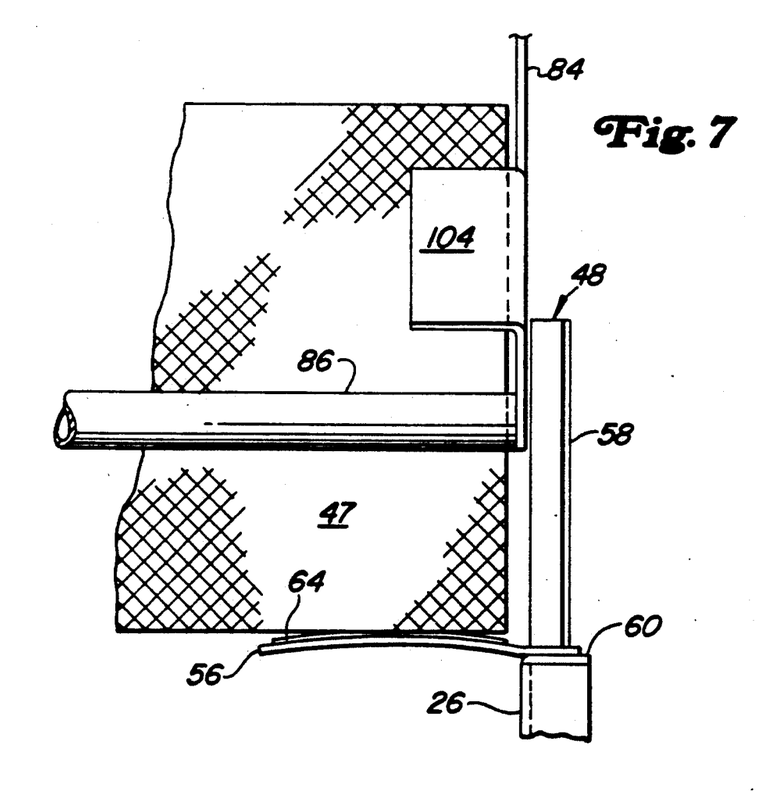
FIG. 7 is a view taken along line 7—7 of FIG.2 showing the right-hand roll end support with the roll end supported thereon.

Each support plate section 56 of the end supports 48 and 50 has a roll contact surface defined by a rectangular sheet of stainless steel foil 64 bonded to the underlying surface of the plate section by strips of double-sided adhesive tape 66 arranged around the perimeter of the foil. Likewise, each of the roll abutment panels 52 and 54 includes a roll contact surface defined by a rectangular sheet of stainless steel foil 68 bonded to the underlying panel by strips of the adhesive tape 66 arranged around the perimeter of the foil 68. The tape 66 is made of an elastomeric material which deflects resulting in an increase in the area engaging or supporting the wrap material roll 47. As can best be seen in FIG. 7, the upwardly bowed surface of the plate sections 56 of the roll end supports 48 and 50 results in the wrap material roll 47 being supported on the highest portion of each of the plate sections 56 thereby resulting in the roll being spaced slightly from the inner edges of the plate sections whereby the wrap material of the roll 47 is kept from being possibly damaged due to contact with the inner edges of the sections. Further, it is to be noted that the bowed upper surface of the plate sections 56 makes it possible to maintain the nonrubbing feature even though there may be a considerable variance in the side-to-side alignment of the end supports 48 and 50. In other words, a relatively loose manufacturing tolerance can be permitted as regards the positioning of the roll end supports 48 and 50 relative to each other.

The end supports 48 and 50 are spaced rearwardly from the roll engaging panels 52 and 54 so that a free passage exists for permitting wrap material to be pulled from the forward face of the wrap material roll 60 during wrapping operation, it being noted that when the wrapping mechanism is in a standby condition during baling operation a length of the wrapping material extends downwardly from the front face of the roll, around the front face of the guide roll 36 and then over the upper feed roll 28 and forwardly between the upper and lower feed rolls 28 and 30.

The loading of the wrap material roll 47 onto the roll end supports 48 and 50 is aided by the provision of a structure for receiving the roll from the bed of a truck or wagon or the like without the need for lifting such roll through any appreciable distance. Specifically, extending horizontally between and having opposite ends secured to lower rear locations of the support walls 26 is a cross member 70 defined mainly by an angle member disposed so that a leg 72 thereof is substantially parallel to the plate sections 56 of the roll end supports 48 and 50. Mounted to transversely spaced locations of the leg 72 of the cross member 70 are a pair of loading handles 74, each being formed of a strap bent so as to define an upright arm 76 and a lower arm 78 with the arms each having free end portions encased in plastic, or the like, to cover up any sharp edges or corners that could be accidentally contacted by an operator and to ensure that no damage will be caused to a roll of wrap material which comes into contact with the arms. Each of the handles 74 is pivotally mounted to the leg 72 of the cross member 70 by means of a pivot bolt 80 that extends through the lower arm 78 at a location adjacent the area joining the lower arm to the upright arm 76 so as to permit each of the handles to be pivoted between a stored position, as shown in FIGS. 2 and 3, wherein the lower arms 78 project transversely inwardly and overlie the cross member 70, and a loading position wherein the lower arms project rearwardly from the cross member and at a slight angle upwardly. The lower arms 78 are at an elevation commensurate with that of the bed of a pickup truck or wagon or the like so as to eliminate the need for lifting a roll of wrap material, located on the bed, any significant amount in order to place the roll onto the arms. In fact, in many cases no lifting will be required at all as the wrap material roll may be rolled directly onto the arms 72. When the loading handles 74 are in their loading position, the upright arms 76 are located in a plane which passes closely adjacent a rearmost edge of the plate sections 56 of the roll end supports 48 and 50. Thus, an operator can easily lift the roll of wrap material 47 from the arms 78 to the plate sections 56 by moving the roll one end at a time, with the space between the plate sections making such movement possible.

A braking mechanism is provided for exerting a drag force on the loaded wrap material roll 47 so as to ensure that the wrap material will be smoothly applied under tension to the surface of a bale being wrapped. Specifically, the braking mechanism comprises a generally u-shaped brake member 82 including a pair of transversely spaced, parallel arms 84 having their rearward ends fixed to opposite ends of a horizontal tubular brake bar 86 and having their forward ends respectively joined to inner ends of a pair of short, cylindrical tubes 88. Joined to the outer end of each of the tubes 88 is a crank arm 90 that extends downwardly and forwardly at an angle of approximately 90° from the adjacent arm 84. Right- and left-hand angle brackets 92 and 94 have respective upright transverse portions 96 respectively bolted to upper right- and left-hand areas of the front wall 42, have respective downwardly and rearwardly angled portions 98 located beneath and parallel to the flange 46 of the wall 42 and have respective vertical, longitudinally extending portions 100. The forward ends of the arms 84 are vertically pivotally mounted to the bracket portions 100 by means of respective pivot pins 102 (FIG. 3) which extend outwardly through respective holes provided in rear locations of the bracket portions 100 and into a respective one of the short tubes 88. Thus, the brake member 82 is mounted for pivoting about a horizontal transverse axis A (FIG. 3). When the brake member 82 is in an upper extreme of its working position, as shown in FIGS. 2 and 3, the brake bar 86 will bear against a lower rear location of a whole roll of wrapping material 47, as illustrated, and will be adapted to swing downwardly through a working zone as the wrap material is pulled from the roll. Spaced above the brake bar 86 and fixed to each of the arms is a short inwardly extending roll stop 104 which is disposed to engage the roll and prevent it from jumping out of position as might happen when the baler is being operated over relatively rough terrain, for example. As is explained in detail below, a spring means acts on the brake member 82 so as to bias the bar 86 against the wrap material roll 47 when the bar is in the working zone.

A cover 106, as viewed in its closed position shown in FIG. 2, includes a top wall 108, a bottom wall 110, a rear wall 112 and opposite side walls 114 joined together to thereby define an opening at the forward side of the cover. The cover 106 is vertically pivotally mounted to the gate 18 by means of a pair of strap hinges 116 defining a horizontal transverse hinge axis B (FIG. 1), the hinges having respective rearward sections fastened to upper forward locations of the cover top wall 108 and having respective forward sections fastened to the respective downwardly and rearwardly angled bracket portions 98 of the pair of angle brackets 92 and 94.

Figure 6:
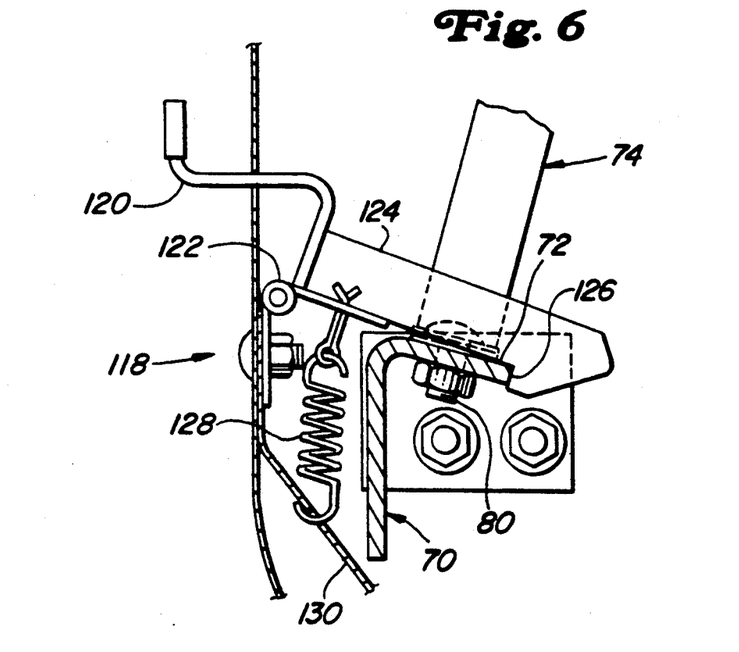
FIG. 6 is an enlarged right side elevational view of the cover latch mechanism illustrated in FIG. 2.

The cover 106 is restrained from pivoting away from its closed position by means of a latch 118 (FIG. 6) including a z-shaped latch handle 120 projecting through an opening provided in a central location of the cover rear wall 112 and being integral with a first section of a hinge 122 having a second section bolted to a central location of the inside of the cover rear wall. Also integral with the handle 120 and the first section of the hinge 122 is a latch hook 124 which projects forwardly from the hinge and has a latch surface 126 which engages a forward surface of the leg 72 of the angle member 70 when the cover 106 is in its lowered closed position, as illustrated. A spring 128 is connected between the first section of the hinge 122 and a reinforcement panel 130 which extends across the cover 106 so as to span the juncture of the rear and bottom walls of the cover. Thus, the cover 106 may be raised to its open position by first pulling back on the latch handle 120 to release the latch surface 126 of the latch hook 124 from the cross member 70 and then elevating the cover to its raised position shown in FIG. 4.

For the purpose of holding the cover 106 in its raised position, there is provided a pair of gas or air springs 132 having respective rod ends pivotally connected, as at 134, to forward end locations of the crank arms 90 and having respective cylinder ends pivotally connected, as at 136, to a respective one of a pair of brackets 138 respectively fixed to the opposite side walls 114 of the cover 106. Thus, it will be appreciated that when the cover 106 is in its closed position the pair of gas or air springs 132 will be compressed between the crank arms 90 and cover brackets 138 and will have respective lines of action resulting in the cover being biased upwardly about its pivot axis B so as to resist movement of the cover towards its closed position. It should be noted that this same action will bias the brake member 82 downwardly so as to maintain the bar 86 in engagement with the material roll 47. Referring now to FIG. 4 wherein the cover 106 is shown raised to its open position, it can be seen that the air springs 132 still act along a line of action which results in the cover 106 being biased upwardly about its pivot axis B. It can also be seen that the lines of action of the air springs 132 pass through the pivotal axis A of the brake member 82 and thus resist pivotal movement of the latter away from its illustrated non-working position wherein it is elevated above the zone normally occupied by a roll 47 of wrap material resting on the roll end support structures 48 and 50 so as to permit a new roll of material to be placed in such zone without interference with the brake member. It is here noted that the brake member 82 is automatically moved between its lowered working range of positions and its raised non-working position in response to the cover 106 being manually pivoted between its lowered, closed position and its raised, open position, with the motion of the cover being transferred to the brake member by the air springs 132.

The operation of the wrap material supply roll housing 40 is briefly as follows. Assuming a whole wrap material roll 47 to be resting on the roll end supports 48 and 50 and the cover 106 to be closed, as shown in FIG. 2, the gas springs 132 will act to bias the brake member 82 downwardly so as to urge the bar 86 into engagement with the periphery of the wrap material roll 47. As wrap material is pulled off the roll 47 during wrapping operations, the pressure exerted on the roll by the bar 80 will ensure that the material remains under tension so as to result in a smooth, tight wrapping being placed on the periphery of the bale. As the roll 47 decreases in diameter, the brake member 82 will continue to move downwardly. In the event that the roll should have a tendency to bounce during operation of the baler, the roll stops 104 and roll end supports 48 and 50 will act to maintain the roll in engagement with the roll contact surfaces defined by the sheets of stainless steel foil 68 that are bonded to the panels 52 and 54 of the housing so that the roll is properly disposed for wrapping operation. Of course, the roll 47 will at this time also be resting on the roll contact surfaces defined by the sheets of stainless steel foil 64 that are bonded to the plate sections 56. Due to the strips of adhesive tape 66 being made of elastomeric material, the foil sheets 64 and 64 will deflect so that a greater area of the roll will be in contact with the sheets to bear the load of the roll and resist the unrolling of material therefrom. Because the sheets of stainless steel foil 64 and 68 are non-corrosive, the resistance they offer to the unrolling of material from the roll 47 will not be altered due to corrosion thus making it easier to design the desired braking force into the brake structure. Also, due to the plate sections 56 of the roll end supports 48 and 50 being crowned, the roll 47 will be supported outwardly of the inner edges of the plate sections so that the edges do not rub against and damage the wrap material. The crowned plate sections 56 also make the assembly of the roll end supports 48 and 50 easier since the tolerance regarding the alignment of the supports with each other may be looser.

When the roll 47 of wrapping material is used up or spent, it is necessary to remove the roll core 57 and load a new roll of wrap material into the housing 40. This is done by pulling back on the latch handle 120 to release the latch hook 124 from the angle member 70 and moving the cover 106 to its raised position, the gas springs 132 aiding in such movement. During movement of the cover to its open position, the air springs 132 act on the brake member 82 to cause it to swing upwardly to its non-working position wherein it is sufficiently spaced from the roll end supports 48 and 50 to permit a replacement roll to be placed thereon without the brake member interfering with the procedure. With the cover 106 in its raised position, the core 57 of the spent material roll 47 is removed and discarded. A truck or cart or other vehicle containing replacement rolls is then moved closely adjacent the open cover 106. The loading handles 74 are then pivoted from their stored positions to their loading positions. The replacement roll of material is then loaded onto lower arms 74 of the handles 78 by either lifting the entire roll and placing it on the arms 78 or lifting first one end and then the other onto the arms. A length of material is then unrolled from the roll and placed about the guide roll 36 with the end of the length being placed into the nip of the feed rolls 28 and 30. The roll 47 is then ready for being placed on the end supports 48 and 50 and this is accomplished either by lifting the entire roll 47 onto the plate sections 56 of the end supports or by lifting first one and then the other end of the roll onto the plate sections. The cover 106 is then closed so as to bring the bar 86 of the brake member 82 into contact with the material roll 47, the latch 118 then being engaged with the cross member 70 so as to maintain the cover closed against the bias of the air springs 132.

We claim:

1. In a large round baler including support structure adjacent a bale-forming chamber, a bale wrapping mechanism mounted to the support structure and including a wrap material supply roll housing having an upwardly facing wrap material roll support surface and an upright roll abutment surface facing away from the chamber for supporting a roll of bale surface wrap material in a dispensing zone adjacent the chamber, a cover including at least top, opposite side and rear walls joined together and being pivotally connected to the support structure for movement about a horizontal transverse axis between a raised open position wherein it is elevated above the dispensing zone and a lowered closed position wherein it encloses the dispensing zone, and at least one spring member acting between the cover and the structure for biasing the cover to resist movement of the cover toward its closed position when the cover is in its open position, the improvement comprising: said wrapping mechanism further including a brake member having a transverse bar mounted for pivotal movement about a second horizontal transverse axis between a working path located within said dispensing zone wherein it contacts a roll of wrap material located in said zone and a raised inoperative position elevated above said dispensing zone; said at least one spring member being connected between the cover and said brake member such that the spring member biases the bar toward an extreme downward position within said dispensing zone when the cover is in its closed position and biases the bar to its inoperative position when the cover is in its open position.

2. The large round baler defined in claim 1 wherein the brake member includes an arm extending radially outwardly from said second pivot axis; said bar comprising a cross member fixed to the arm for traversing said dispensing zone as the brake member moves between its upper inoperative and extreme downward positions; and a crank arm being connected to said arm and to said at least one spring member.

3. The large round baler defined in claim 1 wherein said brake member includes a pair of arms extending radially from said first pivot axis and being spaced apart a distance permitting the roll of wrap material to pass therebetween; and said bar joining the legs and being located for engaging a roll of wrap material located in said dispensing zone.

4. The large round baler defined in claim 3 wherein said brake member includes a crank arm disposed at an angle of about 90° from the pair of legs; and said at least one spring member having an end pivotally coupled to said crank arm.

5. The large round baler defined in claim 4 wherein said housing includes a pair of loading handles spaced transversely for supporting opposite ends of a roll of wrap material and being spaced from the chamber beyond and located downwardly form the wrap material roll support surface and including a roll support arm disposed in a plane generally paralleling the roll support surface; and means mounting the loading handles for movement between a stored position, wherein the support arms are located within a zone enclosed by the cover when the latter is in its closed position, and a loading position wherein the support arms extend away from the chamber for receiving a wrap material roll thereon when the cover is in its open position.

6. The baler defined in claim 5 wherein the loading handles each include an upright arm joined to the support arm, the upright arm being disposed in a plane which passes adjacent an edge of the roll support surface remote from the chamber when the handles are in their loading position.

7. The baler defined in claim 6 wherein said housing includes transversely spaced apart, right- and left-hand roll end supports; said roll support surface including right- and left hand plate sections respectively of said right- and left-hand roll end supports; and said plate sections each being inclined downwardly toward the bale chamber.

8. The baler defined in claim 7 wherein each of said plate sections is upwardly bowed from an inner to an outer edge thereof whereby a roll of wrapping material may be supported without substantial contact with the inner edge of each plate section thereby avoiding damage to the roll.

9. The baler defined in claim 8 wherein the right- and left-hand roll end supports each include an upright section joined to an outer end of the plate section and extending fore-and-aft, with the upright sections being spaced apart a distance slightly greater than the length of a wrap material roll adapted for resting on the plate sections whereby the upright sections serve to prevent sideways shifting movement of a wrap material roll resting on the plate sections.

10. The baler defined in claim 7 wherein each plate section comprises a main body portion of corrodible material having an upper surface to which is bonded a sheet of corrosion resistant material.

11. The baler defined in claim 10 wherein the corrosion resistant material is stainless steel.

12. The baler defined in claim 10 wherein the corrosion resistant material is in the form of foil sheets; and bonding means in the form of double-sided, elastomeric tape being sandwiched between the foil sheets and the corrodible body portions of the plate sections.

13. The baler defined in claim 12 wherein said elastomeric tape is located only about the periphery of the foil sheets.

14. The baler defined in claim 10 wherien said housing includes right- and left-hand support panels respectively located between the right- and left-hand supports and the chamber; and said right- and left-hand support panels each including a roll contact surface made of corrosion resistant material.

15. The baler defined in claim 14 wherein the corrosion resistant material forming the upper surface of each of the roll end support plate sections and forming the roll contact surface of each of the support panels is stainless steel.

16. The baler defined in claim 15 wherein the stainless steel is in foil sheets; and said sheets being bonded to corrodible body portions of the plate sections and support panels through means of double-sided, elastomeric adhesive tape.

17. In a large round baler including a bale-forming chamber and a wrapping mechanism for wrapping a bale with a web of plastic material being mounted adjacent said chamber and including a wrap material housing including a cover mounted for pivotal movement, about a horizontal pivot axis located at an upper location of the cover adjacent the chamber, between a raised open position providing access to an upwardly facing wrap material roll support surface and a lowered closed position enclosing said support surface, the improvement comprising: said housing including a pair of loading handles mounted at lower, transversely spaced locations within the confines of the cover when the latter is closed; said handles each including an upright arm joined to and forming an angle of about 90° with a roll support arm; and means mounting the loading handles for movement between a loading position, when the cover is in its open position, wherein the support arms extend away form the bale-forming chamber at a slight upward inclination form horizontal and the upright arms are located in a plane which passes next to an edge of the support surface which is remote from the bale-forming chamber with upper ends of the upright arms terminating at substantially the level of said edge, and a stored position wherein the support arms extend generally parallel to said edge, the upright arms extend beneath said edge and both arms are within the confines of the cover when the latter is in its closed position.

18. The baler defined in claim 17 wherein the support and upright arms of each of said loading handles has a terminal end portion encased in a smooth synthetic material.

19. In a large round baler including a bale discharge gate, a bale wrapping mechanism mounted to said gate and including a wrap material roll housing including a support structure mounted to a rear portion of said gate, a wrap material roll support fixed to said support structure and including an upwardly and rearwardly inclined roll support surface for supporting a roll of wrap material within a dispensing zone adjacent the rear portion of the gate, a cover being pivotally mounted to the support for vertical pivotal movement about a horizontal transverse axis located adjacent an upper forward end thereof between a lowered, closed position enclosing said dispensing zone and a raised, open position permitting access to said dispensing zone, and at least one spring member connected between the support and the cover and biasing the latter such that it is held in its open position by the spring member, the improvement comprising: said housing including a brake member vertically pivotally mounted to said support for rotation about a second axis extending parallel to said transverse axis and having a crank arm connected to said spring member such that the brake member is biased into engagement with a roll of wrap material located in said dispensing zone when the cover is closed.

20. The baler as defined in claim 19 wherein the geometric relationship between the location of the connection of the spring member to the crank arm and the locations of the transverse and second axes is such that the spring member will act to move the brake member to a raised inoperative position disposed away from said dispensing zone in response to the cover being moved to its raised open position.

21. The baler as defined in claim 20 wherein said brake member comprises a pair of arms spaced apart a distance slightly greater than the length of a roll of wrap material, said crank arm and a second crank arm being respectively joined to the pair of arms for pivoting together therewith; and a second spring member being connected between the cover and the second crank arm.

22. The baler as defined in claim 21 wherein each spring member is a gas spring.

23. In a large round baler including support structure adjacent a bale-forming chamber, a bale wrapping mechanism mounted to the support structure and including a wrap material supply roll housing having an upwardly facing wrap material roll support surface and an upright roll abutment surface facing away from the chamber, said support and abutment surfaces being adapted for engaging the periphery of and supporting a roll of bale surface wrap material in a dispensing zone adjacent the chamber, the improvement comprising: said support surface including right- and left-hand roll end support surface sections forming part of right- and left-hand supports that are separated from each other to define a free space therebetween into which a roll of wrap material may extend when one end is loaded onto one of the support surface sections while the other end is supported adjacent to and at a level below the other one of the support surface sections; said support surface sections being inclined downwardly toward said chamber and said abutment surface; and each of said support surface sections being made of a corrosion resistant material.

24. The large round baler defined in claim 23 wherein said support surface sections are made of stainless steel.

25. The large round baler defined in claim 23 wherien said right- and left-hand roll end supports each include a plate section defining said roll end support surface sections; each plate section being constructed of a main body of corrosive material; and a corrosion resistant material in the form of a sheet being bonded to an upper surface of the main body of each plate section.

26. The large round baler defined in claim 25 wherein a foam material having adhesive on both sides is sandwiched between the sheet of corrosion resistant material and the main body of each plate section and serves to bond the corrosion resistant material to the main body of each plate section.

27. The large round baler defined in claim 26 wherien said foam material is in strip form and is applied substantially only to the perimeter of each sheet of corrosion resistant material.

28. The large round baler defined in claim 26 wherein said corrosion resistant material is stainless steel.

29. The large round baler defined in claim 23 wherien said right- and left-hand roll end supports each include a plate section defining said roll end support surface sections; each plate section including right- and left-hand edges and being curved so as to be upwardly crowned between said edges and located for supporting a wrap material roll substantially free of contact with said edges, thereby preventing the roll from being damaged by contact with said edges and making accommodation for misalignment between the right- and left-hand roll end support surface sections.

30. The large round baler defined in claim 23 wherein said upright roll abutment surface comprises right- and left-hand abutment surface sections each being adjacent to and having a width commensurate with the width of an adjacent one of the roll end support surface sections.

31. The large round baler defined in claim 30 wherein each roll abutment surface section includes at least a portion which is adapted to be in continuous contact with a roll of wrap material resting on the roll end support surface sections; and said portion of each roll abutment surface section being formed of a corrosion resistant material.

32. The large round baler defined in claim 31 wherein said corrosion resistant material is stainless steel.

33. The large round baler defined in claim 32 wherein each of said abutment surface sections forms one side of an upright panel having a corrodible main body; and said corrosion resistant material being bonded to the main body.

34. The large round baler defined in claim 33 wherein a foam material having adhesive on opposite sides thereof is sandwiched between the corrosion resistant material and the main body of each panel and serves to bond the corrosion resistant material to the main body of each panel.

35. The large round baler defined in claim 34 wherein each panel portion is substantially rectangular shaped; and said foam material being in strip form and applied substantially to the perimeter of each panel portion.

36. In a large round baler including support structure adjacent a baler-forming chamber, a bale wrapping mechanism mounted to the support structure and including a wrap material supply roll housing having an upwardly facing wrap material support surface for supporting a roll of bale surface wrap material in a dispensing zone adjacent the chamber, the improvement comprising: said support surface including spaced apart, right- and left-hand roll end support surface sections forming the sole means for engaging an underside of the roll of surface wrap material and forming part of right- and left-hand roll end supports defining a free space therebetween for permitting the roll of surface wrap material to extend therethrough during loading when one end of the roll is placed on one of the roll end support surface sections while the other end of the roll is supported adjacent to but at a level below that of the other of the roll end support surface sections.

37. The large round baler defined in claim 36 wherein the right- and left-hand roll end supports each include right- and left-hand edges and each of said right- and left-hand roll end support surface sections being upwardly bowed between the edges of the roll end support of which it forms a part for thereby supporting a roll of bale surface wrap material so that it does not engage the respective right- and left-hand edges of the left- and right-hand roll end supports.

* * * * *